United States Patent [19]

Söderholm

[11] 4,284,155

[45] Aug. 18, 1981

[54] DEVICE FOR SUPPORTING THE LOAD OR A LOAD CARRIER IN AN ELECTROMECHANICAL SCALE

[75] Inventor: Arne O. Söderholm, Bromma, Sweden

[73] Assignee: S.E.G. Resistor AB, Vallingby, Sweden

[21] Appl. No.: 93,496

[22] Filed: Nov. 13, 1979

[30] Foreign Application Priority Data

Nov. 15, 1978 [SE] Sweden ............................... 7811771

[51] Int. Cl.³ .............................................. G01G 3/10
[52] U.S. Cl. .................................... 177/211; 177/225
[58] Field of Search ............... 177/211, 255, 256, 257, 177/DIG. 9, 225

[56] References Cited

U.S. PATENT DOCUMENTS

| 3,938,603 | 2/1976 | Shoberg | 177/211 |
| 4,023,633 | 5/1977 | Swersey | 177/257 X |

Primary Examiner—Joseph W. Hartary

Attorney, Agent, or Firm—Cushman, Darby & Cushman

[57] ABSTRACT

The invention relates to a device for supporting the load or the load carrier of an electromechanical scale via at least three load transferring points, and for combining the partial loads of the points for superimposing their actions utilizing a central measuring body. The measuring body has an elongated shape and is at each end provided with rigidly connected transversally directed substantially parallel arms in two pairs of arms. Two of the arms, at each end of the measuring body, are each one provided with a supporting device operationally resting against a bed of the scale, and the two other arms, at each end of the measuring body, are each one provided with a supporting device carrying the load or the load carrier. The supporting devices include bars running parallel to the longitudinal axis of the measuring body, the bars forming load transferring points. The action of the load on the measuring body is of a torsional nature and is so dimensioned that it is electrically measurable. It is preferable that the four arms in the pairs of arms have equal effective lever length.

7 Claims, 8 Drawing Figures

U.S. Patent    Aug. 18, 1981    4,284,155
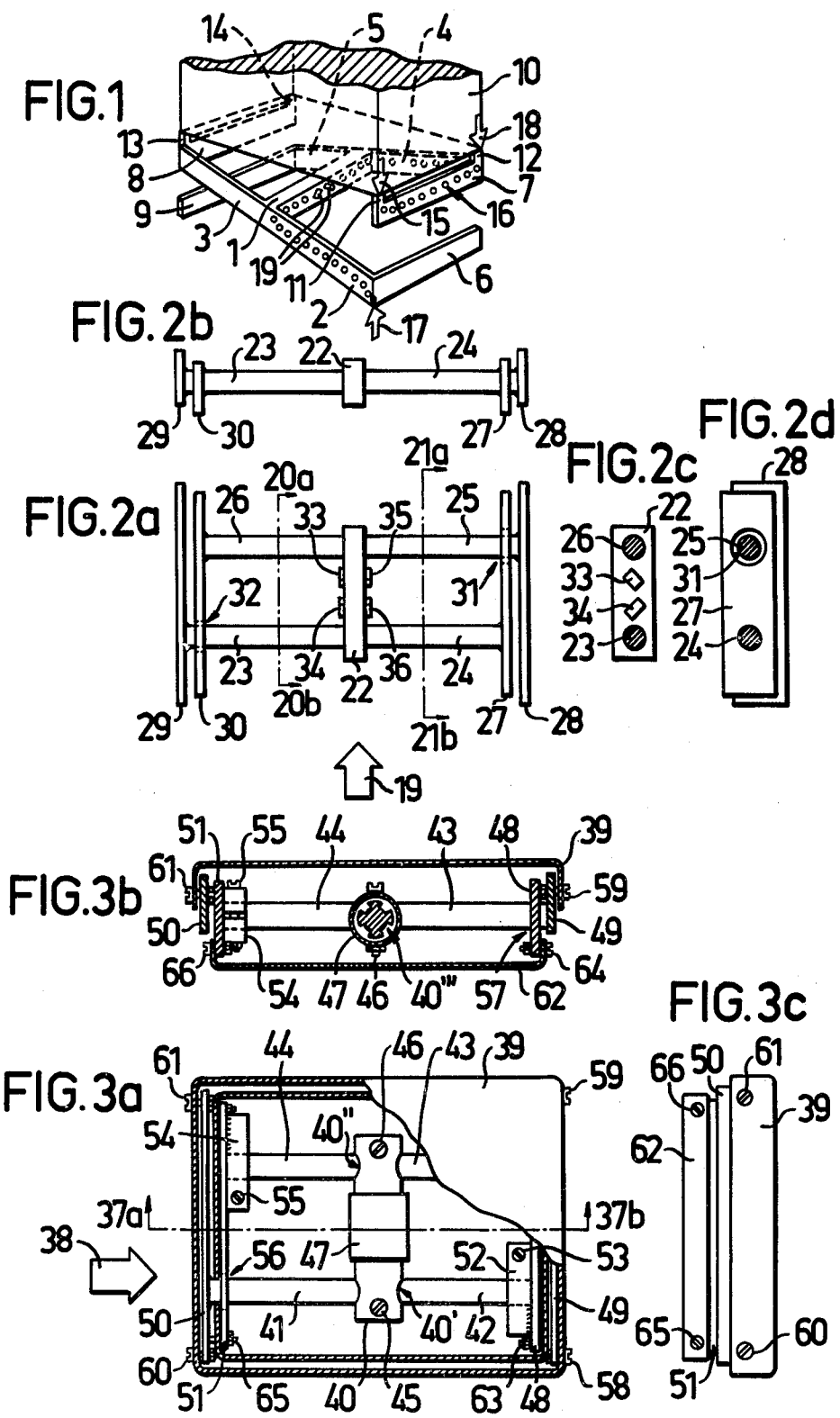

DEVICE FOR SUPPORTING THE LOAD OR A LOAD CARRIER IN AN ELECTROMECHANICAL SCALE

This invention relates to a device for supporting the load or a load carrier in an electromechanical, in which the weight of the load distributed over an area is brought to act on a central body. Independent of the load distribution over the area the action on said body is distinctly in the same degree proportional to the magnitude of the total load.

BACKGROUND

Especially when designing a platform scale it is common practice for a mechanical scale that the platform, the load carrier, via levers from each corner supports and combines the load from said corners to a central point at which a counterbalancing weight is attached and brought to balance out the load. For spring scales the counterweight is replaced by a spring, the elastic deformation of which is a measure of the load on the scale. Another example, refering to a design in which the load on the platform is converted into a hydraulic pressure by means of a hydraulic transducer via levers, is given in the U.S. Pat. No. 3,658,143. To simplify this complicated mechanism the levers in an electromechanical scale are often replaced by a plurality of load transducers arranged under the load carrier as in the U.S. Pat. No. 3,512,595. Especially in smaller scales (for maximal loads below 1 metric ton) these methods result in expensive constructions. The purpose of the present invention is to obtain an accurate and robust scale with a considerably simplified mechanical construction, and in addition with only one load measuring transducer.

SUMMARY OF THE INVENTION

The present invention relates to a device for supporting the load or the load carrier in an electromechanical scale via at least three load transfering points, and for combining the partial loads acting at these points in such a way that their actions are superimposed by means of a central measuring body. By device for supporting the load is meant a device for directly engaging and supporting the load or a device for directly supporting a load carrier which carries the load. According to the invention said measuring body at each one of its ends and transversally to its longitudinal direction has a pair of arms rigidly secured to the body. In addition to that one arm in one of the pairs of arms projecting from one side of the body is via a supporting device operationally resting against a bed for the scale. One arm in the other pair of arms projecting from the same side of the body is via a supporting device at at least one point connected to the load or the load carrier. In conformity with the arrangement of these arms, the second arm in the first pair of arms, projecting from the other side of the body is via a supporting device at at least one point connected to the load or the load carrier. The second arm in the second pair of arms projecting from said other side of the body is via a supporting device operationally resting against said bed of the scale. The torsional strain or the torsional deformation of the measuring body is by means of electric sensors measurable within the range for which the scale is intended to operate. Instruments for measuring the torsional strain in a rod shaped body by means of strain gages, and arranged to measure the force at a transfering point, are known per se. One example is given in Swedish Patent Specification No. 359,922 in which the load to be measured, however, is divided into four arms subjected to torque stress and carrying strain gages.

BRIEF DESCRIPTION OF THE DRAWINGS

In the drawings

FIG. 1 is a perspective schematic view of an apparatus illustrating the principles of the invention;

FIG. 2a is a plan view of a simple, practical apparatus embodying the principles of the invention;

FIG. 2b is an elevational view of the apparatus of FIG. 2a, looking in the direction of arrow 19;

FIGS. 2c and 2d are sectional views, taken on the lines 20a-20b and 21a-21b, respectively, of FIG. 2a;

FIG. 3a is a plan view of another embodiment of the invention;

FIG. 3b is a sectional view on the line 37a-37b of FIG. 3a; and

FIG. 3c is an end view of the apparatus of FIG. 3a.

FIG. 1 illustrates a centrally disposed measuring body 1 in the shape of a rectangular rod, to one end of which a first pair of arms 2, 3 is attached. The two arms consist of a rectangular bar in one piece attached at its midpoint. To the other end of the measuring body a second pair of arms 4, 5 is attached and is shown in dashed lines as it is concealed. This second pair is realized in the same way and has the same dimensions as the pair 2, 3, but the longitudinal axes of the two bars are arranged at a small angle with one another (about 10°). At the ends of the arms supporting devices 6 to 9 are secured, having their longitudinal axes parallel to the axis of the measuring body 1. In the same way as the arms 2, 3 and 4, 5 the supporting devices 6 to 9 consist of rectangular bars of the same length as the measuring body 1. To the arm 2 the supporting device 6 is attached and intended to rest against the frame of the scale, not shown in the figure. The supporting device 7 is attached to the arm 4 in the same way as is the device 6. The device 7, however, is resting against the parallelepipedic body 10 constituting the load on the scale. The ends of the supporting bar 7 are provided with vertical pegs 11 and 12 directed upwards and having a small sectional area, and said pegs are resting against the corners of the parallelepipedic body 10, and thus constitute load transfering points. In a similar way the arms 3 and 5 have supporting devices 8 and 9 secured thereto and are resting against the parallelepipedic body 10 via pegs 13 and 14 (peg 14 concealed), and are also resting against the frame of the scale. For the sake of simplification the body 10 has been drawn with the same dimension in the horizontal plane as the distances between the load transfering points of the scale. These dimensions, however, could also be larger.

The two pairs of arms 2, 3 and 4, 5 respectively, are placed in a small inclination to each other, as is earlier mentioned. The reason for this is that there should be a free space between the supporting devices 6, 7 and 8, 9 respectively. This space could be given such a size that the supporting devices contact each other, if the load surpasses a permissible value. When the load body 10 is placed on the scale, the load will be transfered via at least three of the four load transfering points (pegs 11 to 14). The arrow 15 shows an assumed partial load transfered to peg 11, and the series of points 16 indicates which parts of the device that are influenced by the partial load 15 up to the corresponding reaction force from the frame, indicated by the arrow 17. As the supporting device 7 is rigidly secured to the arm 4, the load 15 will create a torque around the longitudinal axis of the arm 4, and said arm will convert this torque to a bending moment on the measuring body 1. In addition, the load 15 will create a torque in the measuring body 1, having the arm 4 as a lever. The torque in the measuring body 1 is balanced out by the arm 2 and the reaction force 17. The partial load marked by the arrow 18 at the adjacent corner, will, in the same way, create a bending moment, but of the opposite direction, and a torque in the measuring body 1, having the same lever 4. This torque and the one caused by the load 15 are superimposed. The partial loads from the remaining load transfering points (pegs 13 and 14) will, in a similar way, create a torque in the measuring body 1 via the levers 3 and 5. The measuring body is thus subjected to a torsional moment due to each partial load in the transfering points. It is also evident that the sum of the partial moments is porportional to the magnitude of the total load on the condition that the arms 3, 4 and 2, 5 respectively, have the same active lengths. How far this is done depends on the tolerances in the production of the equipment. It is also possible to adjust the effective length of the arms by bending the pegs 11 to 14 transversally with respect to the longitudinal axis of the measuring body 1, moving a weight of known size between the load transfering points 11 to 14 and adjusting the pegs until the torque will be the same irrespective of which one of the transfering pegs is loaded. The measuring body will thus, on one hand, be subjected to a bending moment, the magnitude of which varies with the load distribution between the load transfering points, and, on the other hand, to a torsional moment which, as described above, can be made independent of the load distribution. The bending moment stretches and contracts the top and the bottom side, respectively, of the rod shaped measuring body 1. In its horizontal centre plane (midway between the top and the bottom side) said body is not influenced by this bending moment, whereas the torsional moment has a maximum value in this plane. The simplest way to get a measure of the torque in the measuring body 1 is to use electric strain gages 19, and to mount them so that their tensional sensivity lies in 45° direction to the centre axis of the measuring body. This way of measuring torques, and how electrical connections and signal processing is performed, is well known and is therefore not described in this connection.

To obtain a low height and to minimize the bending moments from the supporting devices 6 to 9, the scale device according to the present invention is designed as is illustrated in FIGS. 2a to 2d. FIG. 2a shows the scale device seen from above, i.e. from the side facing the load direction, whereas FIG. 2b shows the load in the direction of the arrow 19. FIGS. 2c and 2d shows sections along the arrows 20a, 20b and 21a, 21b respectively. There is no load or load carrier shown in these figures in order to simplify them. From FIG. 2a it is evident that the measuring body 22 has rectangular shape and that the pair of arms 23, 24 and 25, 26 respectively, have parallel longitudinal axes, said arms being rigidly secured to the measuring body at each end of it. The arms have circular cross section, and they may, for instance, be made in one piece and be passed through suitable holes in the measuring body and secured to said body by welding. At the ends of the arms supporting devices 27 to 30 consisting of bars having rectangular section and running parallel to the longitudinal axis of the measuring body 22. The supporting device 27 is secured to the arm 24. Said device has an aperture 31 through which the arm 25 passes with clearance. The centre of said aperture 31 and the centre of the securing area between the arm 24 and the supporting device 27 are arranged at a distance from the centre line of said supporting device 27, but are displaced in a direction opposite to that of the also displaced securing area between the arm 25 and the supporting device 28. In a similar way the arms 23 and 26 are secured to the supporting devices 29 and 30 respectively, with an aperture 32 through the supporting device 30 for the arm 23. Due to the displacement of the securing areas of the devices 27 and 30 from said centre lines, said devices from the lowest plane of the weighing device parallel to the plane of FIG. 2a, and the short sides of the cross section of the bars constitute the contact plane of the scale against the bed. The two other supporting devices 28 and 29, the securing areas of which are displaces in a direction opposite to that of the first mentioned supporting devices 27 and 30, constitute the highest contact plane, against which the load or the load carrier is resting. FIG. 2b shows the end side of the measuring body 22 and the pair of arms 23, 24, and how the supporting devices 27, 30 and 28, 29 respectively, are displaced towards the top and the bottom side of the scale device respectively. If the scale is subjected to a load acting from the top side of the scale, a reaction force appears on its bottom side, in the same way as is shown in FIG. 1. The measuring body is then twisted around its longitudinal axis due to the levers 23, 26 and 24, 25 respectively. This torsion is measured by means of the strain gages 33 to 36. FIG. 2c, showing the section along the arrows 20a, 20b, illustrates the location of two of the strain gages, 33, 34. They are mounted in the middle of the side of the measuring body in 45° inclination to the longitudinal axis of the body and perpendicular to each other in order to give as well an increasing as a decreasing resistance simultaneously in the two strain gages. The second pair of strain gages 35, 36 in FIG. 2a is placed in the same torsional directions. FIG. 2d, being a section along the arrows 21a, 21b, shows the arms 24, 25 in cross section and the aperture 31 in the supporting device 27, being made in such a way as to permit free movement of the arm 25. A scale device made according to FIGS. 2a to 2d will, in principle, transfer the load in the same way as a device according to FIG. 1 with the differens, however, that the bending moments on the measuring body 22 due to the supporting devices 27 to 30 will be relatively smaller, as the arms 23 to 26 are secured at a distance from the ends of the supporting devices 27 to 30, and the length of their levers will thus become shorter than when the load acts on any of their ends, as is the case for an embodiment as shown in FIG. 1.

FIGS. 3a to 3c illustrate an embodiment in which the parts are dismountable and adjustable in relation to one another. FIG. 3a shows the device from above, FIG. 3b is a section along the arrows 37a, 37b, and FIG. 3c is a view in the direction of the arrow 38. In FIG. 3a the load supporting plate or platform 39 has been partly cut away to show the remaining parts of the device. In the middle of FIG. 3a the measuring body 40 is shown, to the ends of which the pairs of arms 41 and 44 are secured. Said arms consist of circular rods in one piece passing through parallel holes 40' and 40" in the measuring body 40. Between those walls of the holes that are farthest away from the middle of the measuring body and the ends of said body horizontal slits are made (not shown in the figure), and by means of screws 45, 46 through the end portions of the body a clamping connection is formed, securing the arms 41 to 44 to the measuring body. The middle part of the measuring body 40 is designed to exhibit concentrated tensions caused by torsion but, at the same time, to be stiff to bending moments. The cross section of the measuring body is shown in FIG. 3b illustrating a cross-shaped section obtained by means of four notches 40''' being made from the sides of a cylindrical body. Strain gages are mounted on the bottoms of the notches in 45° inclination with respect to the longitudinal axis of the measuring body (the strain gages are not shown in the figure). For the protection of the measuring circuit a cover 47 is placed over the middle part of the measuring body. The supporting devices 48 to 51 at the ends of the pairs of arms 41 to 44 consist of bars having rectangular section and being parallel to the measuring body 40. The arm 42 is secured to the supporting device 48 by means of a clamping block 52. This block has a transverse hole for an end of the arm 42. Between the hole and an end of the block a horizontal slot is made (not shown in the figure), so that the arm 42 can be clamped by means of a transversing screw 53 through the block. The other end of the clamping block 52 is secured to the supporting device 48 by welding. In a similar way the arm 44 is adjustably secured to the supporting device 51 by means of a clamping block 54 and its screw 55. The clamping connections between the measuring body 40, the supporting devices 48 and 51 and the pairs of arms 41 to 44 permit an adjustment with high accuracy of the lengths of the arms. The arms 41 and 43 are centred with clearance in apertures 56 and 57 in the supporting devices 48 and 51 respectively, and the arms 41 and 43 are secured by welding to the supporting devices 49 and 50 respectively. The load carrier 39 is shaped as a platform with bent down edges which are secured to the load carrying supporting devices 49 and 50 by means of screw connections 58 to 61. In this way the lateral movement of the bars 49, 50 is guided, giving a distinct action of the arms 41 and 43. The bottom of the scale device consists of a plate 62 having bent up sides which are secured to the two remaining supporting devices 48 and 51 by means of screw connections 63 to 66. The screw 64 is concealed by the load carrier 39 and the screw 66 is visible only in FIG. 3c.

The embodiments of the scale device according to the invention illustrated are only typical examples of the idea of the invention, and it is evident that modifications and alternatives are possible without deviation from the basic idea of the invention, given in the accompanying claims.

Thus, in the illustrated embodiments the torsional deformation of the measuring body is measured by means of resistive strain gages. There are several alternative measuring methods known, as magnetoelastic transmitters or oscillating bodies (strings or ribbons) the resonance frequency of which is changed by the torsional deformation, and these methods may as well be applicable. It is also possible to build the measuring body of a packet of transformer sheets to make it possible to use AC magnetization without too heavy iron losses. Levers as well as supporting devices (bars) for the load transfer are, for simplification of the present description, given a simple mechanical form, but a mechanical optimization of their shape may further emphasize the technical effects of the invention.

What I claim is:

1. In an electromechanical scale of the kind in which a load to be weighed is supported on a bed by at least three load transferring points: a measuring body having a longitudinal axis and opposite ends; a pair of arms rigidly connected to the body at opposite ends of said body, each pair having first and second arms extending from opposite sides of the body and transverse to the body, the first arms of each pair extending from the same side of the body and the second arms of each pair extending from the other side of the body; means connected to the outer end of the first arm of one of said pairs for supporting said outer end on said bed; means connected to the outer end of the second arm of said one pair for partially supporting the load; means connected to the outer end of the second arm of the other pair for supporting said outer end on said bed; means connected to the outer end of the first arm of said other pair for partially supporting the load, the first and second arms of the pairs thereby functioning as levers capable of applying torque to the measuring body when a load is supported; and electric means for measuring the torsional strain or torsional deformation of said measuring body.

2. A scale as in claim 1 wherein the longitudinal axes of the pairs of arms are parallel.

3. A scale as in claim 1 wherein the effective lever lengths of the second arm of the first pair and the first arm of the second pair are the same and wherein the effective lever lengths of the first arm of the first pair and the second arm of the second pair are the same.

4. A scale as in claim 1 wherein said means for supporting the load include a quadrangular platform having two adjacent corners connected to the second arm of the first pair and having the remaining corners connected to the first arm of the second pair.

5. A scale as in claim 1 wherein the measuring body is an assembled packet of a plurality of units.

6. A scale as in claim 5 wherein said units are sheets.

7. A scale as in any one of claims 1, 2 or 3 wherein said means for supporting the load are bars extending parallel to the longitudinal axis of the measuring body.

* * * * *